US007473753B2

(12) United States Patent
Parhar et al.

(10) Patent No.: US 7,473,753 B2
(45) Date of Patent: Jan. 6, 2009

(54) ADHESIVE COMPOSITIONS AND METHODS OF USING THE SAME

(75) Inventors: Amrit K. Parhar, North Ridgeville, OH (US); Forest Hampton, III, Elyria, OH (US); Charles N. Bush, Bay Village, OH (US); Fred R. Scholer, East Windsor, NJ (US)

(73) Assignee: Oatey Co., Cleveland, OH (US)

( * ) Notice: Subject to any disclaimer, the term of this patent is extended or adjusted under 35 U.S.C. 154(b) by 106 days.

(21) Appl. No.: 11/104,032

(22) Filed: Apr. 12, 2005

(65) Prior Publication Data

US 2006/0030689 A1 Feb. 9, 2006

Related U.S. Application Data

(60) Provisional application No. 60/599,772, filed on Aug. 6, 2004.

(51) Int. Cl.
*C08G 44/00* (2006.01)

(52) U.S. Cl. .................... 528/44; 156/273.7; 428/40.1; 528/196; 528/198; 528/328

(58) Field of Classification Search ............. 156/273.7; 428/40.1; 528/196, 328, 198, 283, 296, 301, 528/302, 44; 525/355, 361; 524/783
See application file for complete search history.

(56) References Cited

U.S. PATENT DOCUMENTS

| | | | | |
|---|---|---|---|---|
| 3,742,018 | A * | 6/1973 | O'Sullivan | 558/307 |
| 4,158,099 | A * | 6/1979 | Siegrist et al. | 568/635 |
| 5,384,345 | A | 1/1995 | Naton | 523/218 |
| 5,416,142 | A | 5/1995 | Bush et al. | 524/113 |
| 5,817,708 | A | 10/1998 | Congelio et al. | 524/104 |
| 5,821,289 | A | 10/1998 | Congelio et al. | 524/104 |
| 5,859,103 | A | 1/1999 | Congelio et al. | 520/124 |
| 5,962,560 | A * | 10/1999 | Congelio et al. | 524/104 |
| 6,221,486 | B1 | 4/2001 | Soane et al. | 428/364 |
| 6,387,492 | B2 | 5/2002 | Soane et al. | 428/376 |
| 6,617,364 | B2 | 9/2003 | Soane et al. | 521/56 |
| 6,638,984 | B2 | 10/2003 | Soane et al. | 521/56 |
| 2001/0014394 | A1 | 8/2001 | Soane et al. | 428/364 |
| 2001/0044477 | A1 | 11/2001 | Soane et al. | 521/60 |
| 2002/0004132 | A1 * | 1/2002 | Banovetz et al. | 428/343 |
| 2002/0151659 | A1 * | 10/2002 | Suzuki et al. | 525/529 |
| 2003/0008931 | A1 | 1/2003 | Soane et al. | 521/56 |
| 2003/0008932 | A1 | 1/2003 | Soane et al. | 521/56 |
| 2003/0049440 | A1 | 3/2003 | Kuroda et al. | 428/343 |

FOREIGN PATENT DOCUMENTS

| | | |
|---|---|---|
| EP | 0479223 | * 1/1991 |
| EP | 0479223 | 10/1991 |

OTHER PUBLICATIONS

"Storage-stable cyanoacrylate adhesive composition" by Polyakova, A. M. et al. ; Institute of Heteroorganic Compounds, Academy of Chemical Physics, Academy of Sciences, U.S.S.R. From: Otkrytiya, Izobret. 1988, (18), p. 101.*

PCT/US05/25691; International Search Report mailed Oct. 23, 2006.

EP 05 77 9334; Supplementary European Search Report dated Jan. 9, 2008.

* cited by examiner

*Primary Examiner*—Terressa M Boykin
(74) *Attorney, Agent, or Firm*—Renner, Otto, Boisselle & Sklar

(57) ABSTRACT

Adhesive compositions are described which comprise at least one organic sulfoxide, sulfone or sulfide and at least one ketone, ether, ester, amide or carbonate or a mixture thereof. The adhesive compositions also may contain one or more water insoluble polymers such as ABS, PVC and CPVC. Methods of adhesively bonding or welding a first plastic surface to a second plastic surface using these adhesive compositions also are described.

20 Claims, No Drawings

ADHESIVE COMPOSITIONS AND METHODS OF USING THE SAME

REFERENCE TO RELATED APPLICATION

This application claims the priority of provisional Application Ser. No. 60/599,772 filed Aug. 6, 2004. The disclosure of this provisional application is hereby incorporated by reference.

TECHNICAL FIELD

This invention relates to adhesive compositions, and more particularly, to adhesive compositions useful for forming a bond or weld between two polymeric surfaces. The invention also relates to methods of using the adhesive compositions.

BACKGROUND OF THE INVENTION

Adhesives, often referred to as cements, glues or pastes are defined generally as substances capable of holding materials together by surface attachment. Adhesives may attach to surfaces and develop the internal or cohesive strength necessary to hold the materials together while cooling from liquid to solid state, while losing solvent, or during a chemical reaction. Many of the substances designated as adhesives may also be designated as caulking, potting, sealing, casting or encapsulating compounds when employed in a thick mass. In a more restrictive sense, to be termed an adhesive, a substance should be a liquid or a tacky semi-solid, at least for a short period of time in order to contact and wet a surface, and should be used in a relatively thin layer to form a useful joint capable of transmitting stresses from one substrate to another. Thus, the term "adhesives", as used in this specification and in the claims, includes cements, glues and pastes.

Solvent cementing is a process in which thermoplastics, usually amorphous, are softened by the application of a suitable solvent or mixture of solvents, and then pressed together to effect a bond. Many thermoplastic substrates are easier to join effectively by solvent cements than by conventional adhesive bonding. Generally, a small amount of the same resin as that to be cemented is dissolved in a solvent to form the cement. The inclusion of the resin aids in gap filling, accelerates setting, and reduces shrinkage and internal stresses.

Solvent cements also have been utilized to bond different plastic materials to each other, but in such instances, the solvent must be a solvent for both plastics. Usually in such instances, a mixture of solvents is used. The solvent softens (dissolves) the surfaces of the resins to be bonded, and the surface becomes tacky. At this point, the surfaces are brought into contact with each other, often under pressure, and dried.

For many years, solvent cements have been used for joining ABS (acrylonitrile-butadiene-styrene), PVC (polyvinylchloride) and CPVC (chlorinated polyvinylchloride) plastic pipe and fittings. The amount of such plastic pipe used for conveying a variety of liquids is enormous. The major uses are drain, waste, vent, sewer and potable water conveyance. Plastic pipe has increasingly displaced the traditional materials used for the same purpose such as copper, steel, galvanized metal, cast iron, lead and concrete asbestos pipe. Plastic pipe has become the material of choice in the home, municipal, and manufacturing industries.

The current ASTM standard which relates to ABS solvent cements is ASTM D-2235 which specifies that the ABS solvent cements will contain a minimum of 15% by weight of ABS resin and the remainder is methyl ethyl ketone (MEK) solvent. To have a useful product, the ABS cement typically utilizes 30% to 35% resin and the remainder is MEK. The purpose of using higher than minimum resin is to produce a product that has a suitable viscosity for application to pipes and fittings. Viscosity is measured in centipoise, and a typical ABS cement will have a viscosity of 1000 to 3000 centipoise.

The ASTM standard for PVC solvent cements is ASTM D-2564. According to this standard, such solvent cements contain a minimum of 10% PVC resin, inert fillers, and the remainder is one or more solvents from the group of tetrahydrofuran (THF), cyclohexanone (CYH), MEK, and acetone (ACE).

ASTM F-493 sets forth the requirements for CPVC solvent cements as containing a minimum of 10% CPVC resin, inert fillers, and the remainder is one or more solvents including THF, CYH, MEK and/or acetone.

Because of the critical function of the cement or adhesives in maintaining the integrity of the piping system subjected to various and extreme conditions, there is a continuing need for improved adhesive compositions and solvent cement systems. There is also a continuing need for adhesive compositions which are safer and effective.

SUMMARY OF THE INVENTION

An adhesive composition is described which is free of alkyl substituted benzenes and alkyl substituted naphthalenes and which comprises a mixture of:

(a) at least one organic sulfoxide, sulfone or sulfide, or a mixture of two or more thereof, wherein the sulfoxide, sulfone, and sulfide are characterized by the formulae $R_2SO$ (I), $R_2SO_2$ (II) and $R_2S$ (III) respectively, wherein each R is independently an alkyl or an aryl group, and (b) at least one ketone, ether, ester, amide, carbonate, or a mixture of two or more thereof.

Adhesive compositions are also described which are free of alkyl substituted benzenes and alkyl substituted naphthalenes and which comprise:

(a) a water-insoluble polymer comprising polyvinyl chloride, chlorinated polyvinyl chloride, an acrylonitrile-butadiene-styrene polymer, or a mixture of two or more thereof, and (b) a solvent mixture comprising (b-1) at least one organic sulfoxide, sulfone, or sulfide or a mixture of two or more thereof, wherein the sulfoxide, sulfone, and sulfide are characterized by the formulae $R_2SO$ (I), $R_2SO_2$ (II), $R_2S$ (III) respectively wherein each R is independently an alkyl or an aryl group, and (b-2) at least one ketone, ether, ester, amide, carbonate or mixtures of two or more thereof.

Methods of adhesively bonding or welding one plastic surface to another using the above adhesive compositions are also described.

DETAILED DESCRIPTION

In addition to the definitions contained in the Background, the following terms utilized in the present application and claims have the following meanings:

"weld"—to fuse or join two components together through the use of the adhesive compositions of the present invention;

"solvent"—a substance capable of dissolving another substance;

"volatile solvent"—a solvent which evaporates rapidly at room temperature or at a slightly elevated temperature;

"solvent welding"—a process that utilizes solvents to join two surfaces together;

"solvent cement"—an adhesive made by dissolving a plastic resin or compound in a suitable solvent or mixture of solvents. The solvent cement dissolves the surfaces of the pipe and fittings to form a bond between the mating surfaces provided the proper cement is used for the particular materials and proper techniques are followed;

"adhesive (composition)"—includes any liquid coating composition which is capable of forming a bond or a weld between two surfaces;

"primer"—conventionally employed liquid composition which prepares the surface to be bonded for satisfactory adhesive bonding or welding;

"cured"—when most of the solvent applied has evaporated leaving a thermoplastic solvent welded joint fused together so that pressure can be successfully applied;

"DWV"—drain, waste, vent applications.

In one embodiment, hereinafter sometimes referred to as the first embodiment, the adhesive compositions of the present invention are free of alkyl substituted benzenes and alkyl substituted naphthalenes, and the compositions comprise a mixture of:

(a) at least one organic sulfoxide, sulfone, or sulfide, or a mixture of two or more thereof, wherein the sulfoxide, sulfone and sulfide are characterized by the formulae $R_2SO$ (I), $R_2SO_2$ (II) and $R_2S$ (III) respectively wherein each R is independently an alkyl or an aryl group, and (b) at least one ketone, ether, ester, amide, carbonate or a mixture of two or more thereof.

In another embodiment, hereinafter sometimes referred to as the second embodiment, the adhesive compositions are free of alkyl benzenes and alkyl naphthalenes and comprise a mixture of:

(a) a water-insoluble polymer comprising polyvinyl chloride, chlorinated polyvinyl chloride, an acrylonitrile-butadiene-styrene polymer, or a mixture of two or more thereof, and (b) a solvent mixture comprising (b-1) at least one organic sulfoxide, sulfone, or sulfide, or a mixture of two or more thereof, wherein the sulfoxide, sulfone and sulfide are characterized by the formulae $R_2SO$ (I), $R_2SO_2$ (II) and $R_2S$ (III) respectively wherein each R is independently an alkyl or an aryl group, and (b-2) at least one ketone, ether, ester, amide, carbonate, or mixtures of two or more thereof.

As noted, the adhesive mixtures of the first and second embodiments comprise at least one organic sulfoxide characterized by the formula $R_2SO$ (I), or a sulfone characterized by the formula $R_2SO_2$ (II), or a sulfide characterized by the formula $R_2S$ (III) or mixtures of two or more thereof. Each R group in formula I and formula II is independently an alkyl or an aryl group. In one embodiment, the alkyl group will contain from 1 to 5 carbon atoms and may be exemplified by methyl, ethyl, propyl, isopropyl, n-butyl, n-amyl, etc. The aryl group includes substituted aryls such as alkaryl and may contain from 6 to 8 carbon atoms. Examples include phenyl, methylphenyl, etc. In one embodiment, the two R groups in the sulfoxide, sulfone, or sulfoxide are both alkyl groups or aryl groups, and in another embodiment, one R group may be alkyl and the second R group may be an aryl group.

Useful sulfoxides, in one embodiment, include aliphatic sulfoxides, aromatic sulfoxides and cyclic sulfoxides. Specific examples of organic sulfoxides which may be utilized in the adhesive compositions of the present invention include dimethyl sulfoxide, diethyl sulfoxide, dipropyl sulfoxide, di-n-butyl sulfoxide, ethylmethyl sulfoxide, diphenyl sulfoxide, tetramethylene sulfoxide, etc. Examples of aliphatic, aromatic and cyclic organic sulfones useful in the invention include dimethyl sulfone, diethyl sulfone, dipropyl sulfone, di-n-butyl sulfone, ethyl methylsulfone, diphenyl sulfone, tetramethylene sulfone (sulfolane) 2-4-dimethylsulfolane. Useful sulfides include linear, cyclic and aromatic sulfides. Examples of the organic sulfides include dimethyl sulfide, diethyl sulfide, dipropyl sulfide, di-n-dibutyl sulfide, di-sec-butyl sulfide, di-amyl sulfide, ethylmethylsulfide, diphenyl sulfide, tetramethylene sulfide, etc.

In the second embodiment, the adhesive mixture also contains a water insoluble polymer comprising polyvinyl chloride (PVC), chlorinated polyvinyl chloride (CPVC) or an acrylonitrile butadiene-styrene polymer (ABS), or a mixture of two or more thereof. These adhesive compositions containing the water insoluble polymers generally are known in the industry and may be referred to herein as "solvent cements". The amount of water insoluble polymers included in the adhesive compositions of the second embodiment depends in part on the particular water insoluble polymer and the intended use of the adhesive. In one embodiment, the adhesive compositions of the invention contains from about 1% to about 60% by weight of ABS, PVC, CPVC. In other embodiments, the adhesive compositions of the invention contain from about 1% to about 30% by weight or from about 10 to about 15% by weight of PVC, CPVC. In another embodiment the adhesive compositions may contain at least 5% of the water insoluble polymer.

The above water insoluble polymers utilized in the compositions of the second embodiment may be freshly prepared polymer, and in some instances may be polymer regrind. The choice of polymer included in the composition generally will depend upon the intended end use of the adhesive composition. For example, if the adhesive composition is to be used as a cement for bonding ABS surfaces, the polymer used in the adhesive composition generally will be ABS. Similarly, if the adhesive composition is to be used for bonding PVC or CPVC surfaces, the polymer in the composition will be PVC or CPVC.

The ABS polymer dissolved in the solvent to form the adhesive compositions of the present invention generally will have a minimum butadiene content of 6%, a minimum acrylonitrile content of 15% and a minimum styrene or substituted styrene content of 15%. In one embodiment, useful ABS resins contain from about 25-45% acrylonitrile, 6-15% butadiene and 40-60% styrene or substituted styrene. Useful ABS polymers are available commercially from General Electric, for example. Blendex ADG-21 is an ABS resin from GE which is approved for use in NSF sanctioned pipe applications, and this resin comprises about 35.4% acrylonitrile, 7.46% butadiene and 56.9% styrene. Its density is 1.02 g/cc. Blendex 200 is another ABS resin from GE which contains about 36.3% acrylonitrile, 9.50% butadiene, and 54.1% styrene. The bulk density of Blendex 200 is 1.03 g/cc.

In one embodiment, the water insoluble polymer is a vinyl chloride polymer or copolymer including, for example, polyvinyl chloride (PVC) and chlorinated polyvinyl chloride (CPVC). Vinyl chloride polymers and copolymers are well known in the art. Copolymers of vinyl chloride include, for example, copolymers of vinyl chloride with one or more copolymerizable monomers having at least one terminal $CH_2{=}C{<}$ group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, or up to 20% of the copolymerizable monomers.

In one embodiment, the inherent viscosity of the PVC polymers and copolymers may range from about 0.30 to 1.5, or from about 0.30 to 0.95. The inherent viscosity (IV) of the water insoluble polymer affects the viscosity and the viscosity stability of the adhesive compositions. PVC homopolymers and copolymers are available from a number of commercial sources. For example, useful PVC resins are available from Georgia Gulf under the designations 2066 (inherent viscosity of 0.68) and 1055 (inherent viscosity of 0.52). PVC homopolymer resins are available from Occidental Chemical Corporation under the designation OXY 190 or Geon such as Geon 110X334. Copolymers are available from Occidental Chemical Corporation under the designation OXY 1415 (16% bound vinyl acetate, inherent viscosity 0.37, and bulk density 0.66 g/cc) and OXY 1515 (13.8% bound vinyl acetate, inherent viscosity 0.47, and bulk density of 0.61).

The chlorinated polyvinyl chlorides (CPVC) useful in the adhesive compositions of this invention include chlorinated polyvinyl chloride (also referred to sometimes as post-chlorinated PVC) homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57% to about 75% by weight of chlorine. CPVC is often the resin of choice where its high heat deflection resistance is desirable such as in hot water piping systems. CPVC resins useful as the water-insoluble resin in the composition of the invention are available commercially from, for example, Noveon (formerly B. F. Goodrich) under the trade designations Temprite 674X571 and Temprite 670X677. Chlorinated polyvinyl chlorides are available commercially from Noveon under the trade names Blazemaster®, Flowguard Gold® and Corzan®. Chlorinated polyvinyl chlorides are available from ATOFINA under the tradename Lucalor®.

In one embodiment, the adhesive compositions of the second embodiment containing the above described water-insoluble polymers (i.e., ABS, PVC and/or CPVC) may also comprise from about 0.1 to about 60% by weight of water-insoluble acrylic polymers, vinyl aromatic polymers, vinyl pyrrolidone polymers or a mixture of two or more thereof. Generally, the amount of these polymers in the compositions is from about 1-30% by weight or from about 3% to about 20% by weight, or from about 3% to about 15% by weight.

The acrylic polymers useful in the adhesive compositions are polymers and copolymers of acrylic esters represented by the general formula $CH_2{=}C(R^1)C(O)OR^5$ wherein $R^1$ is hydrogen or a lower alkyl group containing from 1 to about 6 carbon atoms, and $R^5$ is a lower alkyl group containing from 1 to about 16 or more carbon atoms. More often, $R^1$ is hydrogen or a methyl or ethyl group and $R^5$ is an alkyl group containing from 1 to about 4 carbon atoms. Examples of such acrylic esters include: methyl acrylate, ethyl acrylate, propyl acrylate, isopropyl acrylate, n-butyl acrylate, sec-butyl acrylate, isobutyl acrylate, hexyl acrylate, heptyl acrylate, 2-heptyl acrylate, 2-ethyl hexyl acrylate, dodecyl acrylate, hexadecyl acrylate, methyl methacrylate, methyl ethacrylate, ethyl methacrylate, ethyl ethacrylate, etc.

Acrylic copolymers also can be prepared by copolymerizing an acrylic ester monomer with other monomers such as other acrylic esters, acrylic acid, methacrylic acid, acrylamide, methacrylamide, acrylonitrile, maleimide and N-substituted maleimides such as N-alkylmaleimide, N-cycloalkylmaleimide and N-arylmaleimide, and styrene. Acrylic copolymers can be obtained by polymerizing two or more of the above-described monomeric acrylic esters by procedures well known to those skilled in the art, and many acrylic copolymers are available commercially. The acrylic polymers and copolymers can be made by free radical polymerization initiated by peroxide or azo catalyst, or by redox polymerization. The basic polymerization processes include bulk polymerization, suspension polymerization, emulsion polymerization and solution polymerization.

Acrylic polymers and copolymers which may included in the compositions useful in the present invention are available from a variety of commercial sources. Many acrylic polymers and copolymers are available from Rohm & Haas Company under various trade designations such as "Paraloid®", "Acryloid®.", etc. Specific examples of such acrylic polymers and copolymers include Acryloid B-67, Paraloid K-120N, Paraloid KM-390, Paraloid KM-334. Acrylic polymers and copolymers also are available from Kaneka Texas Corp. under such trade designations as FM-10, FM-20 and PA-10. Another group of useful commercial acrylic polymers and copolymers is available from ICI Acrylics, St. Louis, Mo., under the general trade designation "Elvacite Acrylic Resins." For example, Elvacite 2010 is a medium molecular weight polymer of methyl methacrylate; Elvacite 2021 is a high molecular weight polymer of methyl methacrylate; Elvacite 2043 is a low molecular weight polymer of ethyl methacrylate; Elvacite 2044 is a high molecular weight polymer of n-butyl methacrylate; Elvacite 2016 is a low molecular weight copolymer of methyl and n-butyl methacrylates; and Elvacite 2046 is a high molecular weight copolymer of equal parts of n-butyl methacrylate and isobutyl methacrylate.

In one embodiment, the acrylic polymers which are utilized in the compositions of the present invention are imide-containing acrylic polymers. The imide-containing acrylic polymers and copolymers are available commercially and may be prepared by a variety of procedures. Imidized acrylic polymers may be prepared by reacting an acrylic polymer or acrylic copolymer with ammonia or a primary aliphatic or aromatic monoamine. The imide group is formed by the reaction of the monoamine with two or more of the following groups which may be present in the acrylic polymer: carboxylic acid group, carboxylic ester group, carboxamide (e.g., from methacrylamide), etc. Such imidized acrylic polymers and their preparation have been disclosed in various patents and publications, and such polymers have been referred to as glutarimide acrylic copolymers or polyglutarimides in view of the formation of glutarimide groups when the ammonia or primary amine reacts with the acrylate copolymer. Reactions of ammonia and primary aliphatic amines with acrylate polymers are described in, for example, U.S. Pat. No. 4,246,374 to Kopchik and U.S. Pat. No. 4,727,117 to Hallden-Abberton et al, and a procedure utilizing primary aliphatic amines is described in U.S. Pat. No. 3,284,425, which patents are hereby incorporated by reference for their disclosure of the methods of preparing the imidized acrylic polymers useful in the present invention.

The imidized acrylic polymers containing glutarimide groups may be characterized by the formula

IV

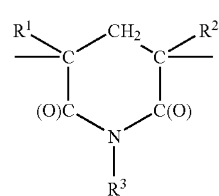

wherein $R^1$, $R^2$ and $R^3$ are each independently hydrogen or lower alkyl, aryl, alkaryl or aralkyl groups. The term "lower alkyl" is utilized in the present application and claims is intended to include alkyl groups containing from 1 to about 6 carbon atoms such as methyl, ethyl, propyl, butyl, amyl, hexyl, and the various isomers thereof. Generally, $R^1$, $R^2$ and $R^3$ are lower alkyl groups and preferably methyl or ethyl groups.

The imidized acrylic polymers useful in the present invention also may be characterized as containing repeating units which are characterized by Formula V.

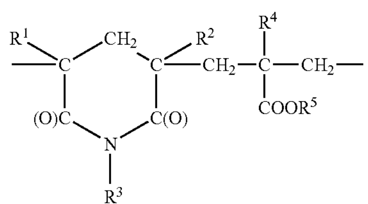

wherein $R^1$, $R^2$, $R^4$ and $R^5$ are each independently hydrogen or lower alkyl groups containing from 1 to about 6 carbon atoms, and $R^3$is hydrogen or an alkyl, aryl, alkaryl or aralkyl group. In Formula II, $R^1$, $R^2$, $R^3$, $R^4$ and $R^5$ are generally methyl or ethyl groups, preferably methyl groups.

The acrylic polymers which are reacted with the amines to form the imidized acrylic polymers may be any polymer containing units derived from esters of acrylic or methacrylic acid. The polymer can be single or multiple stage, but in the latter case, the outer or final stage must contain units derived from acrylic or methacrylic acid. While any such acrylic or methacrylic acid ester can comprise the acrylic polymer, generally at least 25% by weight, and more often above about 80% by weight of the acrylic polymer is derived from esters of acrylic or methacrylic acid. The acrylic polymer can be of a wide range of molecular weights and can be in any form.

The degree of imidization of the acrylic polymer is readily controlled by the imidization process, and different degrees can be obtained for different properties desired in the final product. As low as 1% imidization can be achieved, and for the purposes of this invention, at least 5% imidization is desirable. About 100% imidization can be achieved by the process described in U.S. Pat. No. 4,246,374, and in such instances, essentially all of the ester (or acid) groups present in the acrylic polymer are converted to imide moieties. Repeating units characterized by Formula V described above are present in the imidized acrylic polymer when there is less than 100% imidization. As will be noted, the repeating units in Formula V contain acrylic ester units of the formula

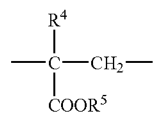

wherein $R^4$ and $R^5$ are each independently hydrogen or a lower alkyl group containing from 1 to about 6 carbon atoms. Examples of imidized acrylic polymers include: poly(methylmethacrylate) with ammonia or methyl amine; a copolymer of methyl methacrylate and ethyl acrylate with ammonia or methyl amine; and a copolymer of methyl styrene and methyl methacrylate with ammonia or methyl amine.

An example of an imidized acrylic polymer, and more particularly, a glutarimide acrylic copolymer which is commercially available is a product designated Paraloid HT-510 from Rohm & Haas Company. This product is reported to be characterized by repeating units of Formula II wherein $R^1$, $R^2$, $R^3$, $R^4$ and $R^5$ are methyl groups. Other polyimide copolymers manufactured and sold by the Rohm & Haas Company include Paraloid EXL4151, Paraloid EXL-4171, Paraloid EXL-4241 and Paraloid EXL-4261.

Imide-containing acrylic polymers useful in the compositions and methods of the invention may also be prepared by other known techniques. For example, they may be prepared by copolymerization of an alkylacrylate or alkylmethacrylate with maleimide, N-alkylmaleimide, N-cyclohexylmaleimide or N-arylmaleimide, etc.; copolymerization of alkylmethacrylates, maleimide, and/or N-alkyl and/or N-cyclohexyl, and/or N-aryl-maleimides, styrene and/or ring-substituted styrenes or .alpha.-methylstyrene; copolymers of styrene, ring-substituted styrenes with maleimide or N-alkyl, or N-cyclohexyl, or N-aryl-maleimides; etc.

In one embodiment, the imide-containing acrylic polymers are acrylic polymers prepared by the polymerization (generally free radical) of alkyl methacrylate with maleimide or substituted maleimides. The copolymers can be prepared having a wide range of molecular weights and with a wide range of acrylate group monomers and a wide range of maleimide group monomers.

The methacrylate group monomers include, for example, methyl methacrylate, ethyl methacrylate, etc. The maleimide group monomers include maleimide, N-methylmaleimide, N-ethylmaleimide, N-phenylmaleimide, -cyclohexylmaleimide, etc. A third monomer may be present which may contain an acrylate group such as ethyl acrylate, propyl acrylate, butyl acrylate, etc. Copolymers can be prepared from mixtures of the first two monomer groups, mixtures of the second and third monomer groups, and mixtures comprising all three groups of monomers. The imide-containing copolymers useful in the present invention generally will contain 70% or more of the acrylate monomer fraction and up to about 30% by weight of the maleimide monomer fraction. More often the copolymers contain from about 90% to about 99% by weight of the acrylate monomer fraction and from about 1% to about 10% by weight of the imide monomer fraction.

Imide-containing acrylic copolymers such as described above are more fully described in U.S. Pat. No. 5,073,615 which is hereby incorporated by reference for its disclosure of such imide-containing copolymers and their preparation. Such imide-containing copolymers useful in the present invention are available commercially from ICI Acrylics, Inc., St. Louis, Mo., under the general designation Perspex HHA. HHA-8, HHA-15 and HHA-16 are copolymers obtained from a mixture comprising methyl methacrylate and N-cyclohexylmaleimide.

The vinyl aromatic polymers which may be included in the adhesive compositions may be homopolymers, copolymers, terpolymers or graft polymers. The copolymers include polymers of a vinyl aromatic compound and one or more copolymerizable monomers such as unsaturated dicarboxylic acid compounds including the acids, anhydrides, imides, metal salts and partial esters of said acids; acrylic acids and esters; alkyl-substituted acrylic acids and esters; acrylonitriles; dienes such as butadiene; etc. The terpolymers include polymers of the vinyl aromatic compound with two or more monomers including dienes, acrylonitrile, acrylic acids and esters, etc.

The vinyl aromatic compounds include styrene and the various substituted styrenes which is represented by the following formula VI

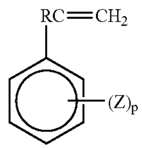

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyltoluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of homopolymers of vinyl aromatic compounds include polystyrene, poly(alpha-methylstyrene), poly(p-methylstyrene) and high impact polystyrene (HIPS).

The maleic anhydride and maleimide derivative compounds utilized in the formation of the copolymers with vinyl aromatic compounds may generally be represented by the formula

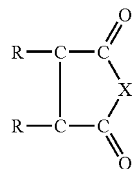

wherein each R group is hydrogen or an aliphatic or aromatic hydrocarbyl group or the two R groups are joined together to form a fused ring derivative, X is O or $NR^2$ where $R^2$ is a hydrocarbyl group which may be an aliphatic or an aromatic hydrocarbyl group such as phenyl, methyl, ethyl, propyl, butyl, etc. In one embodiment, both R groups are hydrogen and X is O.

Copolymers comprising a vinyl aromatic compound and metal salts of maleic acid also are useful in the blended polymer compositions of the present invention. The metals present in the metal salt of maleic acid may be Group I metals, Group II metals or transition metals. Alkali metals and transition metals are preferred. Partial esters of the unsaturated anhydrides also can be used. These can be obtained, for example, by reacting or esterifying, maleic acid or maleic anhydride with less than one equivalent of an alcohol such as methanol, ethanol, propanol, etc.

Examples of copolymerizable acrylic acids and esters include: methyl acrylate, ethyl acrylate, butyl acrylate, methyl methacrylate. Other vinyl monomers which can be used to form the copolymers and terpolymers include vinyl acetate, vinyl methyl ether, vinyl ethyl ether, vinyl chloride, isobutene, etc. The vinyl aromatic compounds also can be polymerized with dienes such as butadiene. SBR is a commercially available copolymer of styrene-butadiene.

The copolymers of the vinyl aromatic compounds with maleic anhydride, N-substituted maleimides or metal salts of maleic acid are obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic compound to a temperature at which the vinyl aromatic compound will polymerize, (2) stirring the polymerizing vinyl aromatic compound while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic compound is polymerizing. Procedures for preparing such copolymers are known in the art and have been described in, for example, U.S. Pat. No. 2,971,939.

Styrene-maleic anhydride copolymers (SMA) are available commercially from, for example, ARCO under the general trade designation Dylark. Examples include: Dylark DBK-290 reported to comprise about 18% by weight of maleic anhydride and about 82% by weight of styrene; Dylark 332 reported to comprise about 14% by weight of maleic anhydride and 86% by weight of styrene; and Dylark 134 reported to comprise about 17% by weight of maleic anhydride, the balance being styrene.

Other Dylark materials available include transparent grades: Dylark 132 (Vicat 109° C.), Dylark 232 (Vicat 123° C.), and Dylark 332 (Vicat 130° C.). Impact grades include Dylarks 150,250,350 and 700 which are believed to be blends and/or grafts of SMA with SBR.

Other examples of styrenic and alpha-methyl styrene copolymers with maleic anhydride and acrylonitrile include Arvyl 300 MR and 300 CR.

Other examples of copolymers of vinyl aromatic compounds include: styrene-acrylonitrile (SAN) such as the styrene acrylonitrile copolymer available from Monsanto under the trade designation Lustran 31-2060; styrene-acrylic acid; styrene methacrylic acid; styrene-butadiene such as the styrene butadiene copolymer available from Phillips under the designation K-resin; styrene-isoprene; and the hydrogenated versions of styrene-butadiene and styrene isoprene copolymers. The copolymers may be of the grafted or block types.

The vinyl pyrrolidone polymers which may be included in the adhesive compositions of the invention may be homopolymers, copolymers, terpolymers or graft polymers. Copolymers include polymers of the vinyl pyrrolidone and one or more copolymerizable monomers such as acrylic acids or esters, vinyl esters, etc. The vinyl pyrrolidone monomer generally is an N-vinyl or 1-vinyl, 2-pyrrolidone monomer. The pyrrolidone ring may contain one or more substituents such as lower alkyl groups. In one embodiment, copolymers of N-vinyl-2-pyrrolidone with an acrylic or vinyl ester preferred. Copolymerizable acrylic esters include methyl acrylate, ethyl acrylate, methylmethacrylate, etc. Copolymerizable vinyl esters include vinyl acetate, vinyl propionate, etc. A preferred vinyl ester is vinyl acetate.

Polymers and copolymers of vinyl pyrrolidone are available commercially such as from G.A.F. Examples of homopolymers include PVP K-60 and PVP K-30. Examples of copolymers include PVPNA 1-735; PVPNA W-735; PVPNA E-535; and PVPNA 1-535.

The adhesive compositions of the present invention also comprise at least one ketone, ether, ester, amide, carbonate, or a mixture of two or more thereof. In one embodiment the adhesive compositions comprise a mixture of at least one ketone and tetrahydrofuran. In another embodiment, the adhesive compositions of the present invention are free of tetrahydrofuran. The amount of ketone, ether, ester, amide, and/or carbonate contained in the adhesive compositions of the invention may vary over a wide range. In one embodiment, the amount of ketone ether, ester, amide, and/or carbonate contained in the adhesive compositions may range from about 10%, 20%, 30% or 50% up to about 60%, 70%, 80%, 85% or even 90% by weight of the adhesive composition. When the adhesive compositions of the present invention are to be used weld or bond together to plastic surfaces, the ketone, ether, ester, amide, and/or carbonate, together with the organic sulfoxide, organic sulfone or organic sulfide function as a solvent for the plastic surface or surfaces which are to be welded or bonded together by the adhesive composition. In addition, when the adhesive compositions of the present invention contain one or more of the water-insoluble polymers described above, and the adhesive composition is to be used as a solvent cement, the organic sulfoxide, sulfone or sulfoxide together with the ketone, ether, ester, amide, and/or carbonate also function as a solvent for the water-insoluble polymer(s) contained in the adhesive composition.

The adhesive compositions of the present invention comprise, in one embodiment, at least one ketone, and in other embodiments, at least two ketones. The ketones which may be utilized in the adhesive compositions include linear and cyclic aliphatic ketones, aromatic ketones, mixed aliphatic/aromatic ketones, etc. The term "ketone" as used herein includes diketones. Specific examples of useful ketones include acetone, methyl ethyl ketone (MEK), methylpropyl ketone (MPK), ethyl propyl ketone (EPK), methyl butyl ketone (MBK), methylisobutyl ketone (MIBK), isophorone, acetyl acetone (ACAC), acetyl acetonate, cyclopentanone (CYP), cyclohexanone (CYH), cycloheptanone, 2-t-butyl cyclohexanone, 4-t-butyl cyclohexanone, 2-isopropyl-4 methyl cyclohexanone, acetophenone (ACPH), diphenyl ketone, etc. Examples of useful mixtures of ketones include a mixture of methyl ethyl ketone and cylcohexanone, a mixture of methyl ethyl ketone and acetone, a mixture of acetone and acetophenone, and a mixture comprising methyl ethyl ketone, acetone and cyclopentanone.

In one embodiment, the ethers which may be included in the adhesive compositions of the invention may be linear or cyclic aliphatic ethers, or aromatic ethers. The cyclic ethers include mixed ketoethers. Specific examples of useful ethers include dimethoxy ethane, dimethyoxy propyl glycol, tetrahydrofuran (THF), tetrahydropyran 1,3-dioxane, 1,4-dioxane, 1,3 dioxolane, tetramethyl tetrahydrofuran, 2,3 dihydrobenzofuran, tetrahydro-4-H-pyran-4-one, tetrahydrothio pryran-4-one, methyl cellosolve, thioxane, etc.

In one embodiment, the esters which may be included in the adhesive composition of the invention include linear as well as cyclic esters. Examples include methylacetate, ethyl acetate, propyl acetate, ethyl formate, ethyl propionate, butyl acetate, propylene glycol methyl ether acetate, 2-butyoxy ethylacetate, ethyl lactate, dimethyl succinate, butyrolactone, etc.

The amides which may be included in the adhesive compositions include linear and cyclic amides such as N,N-2-trimethyl propionamide, tetramethyl urea, pyrrolidone, N-methylpyrrolidone, etc.

The carbonates which may be included in the adhesive compositions include ethylene carbonate, propylene carbonate, 1,2-butylene carbonate, etc.

Other solvents for ABS, PVC and CPVC also may be included in the adhesive compositions of the present invention in addition to the solvents described above. In one embodiment, the solvents utilized in the adhesive compositions of the present invention are volatile solvents, that is, they are capable of vaporizing under a wide variety of application temperature conditions. In one embodiment, the volatile solvents are those which are capable of vaporizing at ambient or at temperatures slightly above ambient temperatures. Examples of useful additional solvents include, for example, halogenated solvents such as methylene chloride, ethylene dichloride, and trichloroethylene; and other liquids such as dimethyl formamide (DMF). As noted earlier, the choice of solvents depends upon the type of water-insoluble polymers incorporated into the adhesive compositions, and the intended use of the composition. The choice of solvents also may be determined after a consideration of the toxicity effects and the biodegradability of the solvents.

In addition to the above components, the adhesive compositions may contain at least one solid particulate inorganic filler. The amount of filler is determined by the end use of the composition. Thus, the adhesive compositions of the present invention may be characterized as containing from 0 to about 4% or even up to 5% by weight of at least one solid particulate inorganic filler. The adhesive compositions of the present invention generally will contain at least about 0.1% or 0.75% by weight up to about 1.5% or 3% or 4% by weight of the solid particulate inorganic filler. The particulate inorganic fillers are inert and are generally included in the compositions of the present invention to improve working viscosity and structural strength, and to reduce costs.

The solid particulate inorganic fillers incorporated into the adhesive compositions of the present invention preferably are fine powders having an average particle size of less than about 50 microns and a density of less than about 4 g/cc. The inorganic fillers which can be utilized in the adhesive compositions of the present invention include amorphous silica, silica flour, ground quartz, talc, magnesium silicate, calcium carbonate, clay, whiting, shell flour, wood flour, alumina, antimony trioxide, asbestos powder, barium sulfate, calcined clays, China clays, magnesium oxide, mica powder, fumed silica, etc. A preferred filler is fumed silica available commercially from Cabot Corporation under the trade designation CAB-O-SIL and from the Degussa Corporation under the trade designation Aerosil. For example, CAB-O-SIL grade PTG is a fumed silica available from the Cabot Corporation and having a surface area of 200.+−0.25 $m^2/g$ and a nominal particle diameter of 0.014 microns.

The compositions useful in the present invention should be thoroughly blended to provide substantially homogeneous mixtures. Substantially homogeneous mixtures are desirable since non-uniform mixtures will result in non-uniform distribution of the adhesive composition and non-uniform adhesion to substrate surfaces. Other components can include lubricants, hollow microspheres, stabilizers, plasticizers, colorants, pigments, processing aids, etc. Small amounts of pigments or colorants such as titanium dioxide, carbon black or a dye or other colorant may be added to the adhesive compositions to serve as a guide for uniform mixing and to provide a method of identifying various adhesive compositions. Exemplary stabilizing agents for PVC and CPVC formulations include alkyltin compounds such as methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); butylthiostannoic acid; etc. Di-lower alkyl tin stabilizers such as $C_4$ to $C_8$ alkyltin mercaptides are normally preferred. The stabilizers are generally present in amounts of from about 0.05 to 3% by weight.

As noted above, the adhesive compositions may further comprise hollow microspheres including inorganic or synthetic resinous hollow microspheres. The microspheres incorporated into the compositions of the present invention generally have a density of less than about 0.6 g/cc and a mean diameter of less than about 200 microns, more often less than about 150 microns. The compositions of the invention may contain from about 1% to about 30% by weight of the composition, or from about 3% to about 20% by weight of the composition, or from about 5% to about 15% by weight of the composition, of the hollow microspheres. The hollow microspheres act as a filler and decrease the density of the adhesive composition.

In embodiments including particulate inorganic fillers and hollow microspheres, the filler reduces the tendency of the microspheres to separate and float to the surface of the adhesive composition. That is, the filler helps to maintain the microspheres in suspension. The tendency of the microspheres to separate from a homogeneous mixture is referred to in the industry as "bead float out".

In one embodiment, the inorganic hollow microspheres used in the present invention are glass microspheres or microbubbles such as those described in U.S. Pat. No. 3,365,315. The walls of these microspheres are made by expanding solid glass particles at temperatures above 1000° C. to form tiny hollow spheroids having an apparent density in the range of about 0.14 to about 0.38 g/cc, a wall thickness of about 0.5 to 2.0 microns, and an average particle size of about 60 microns. Other suitable glassy or inorganic microspheres of synthetic fused water-insoluble alkali metal silicate-based glass are described in U.S. Pat. No. 3,230,184, and microspheres made of sodium silicate which are useful in the present invention are described in U.S. Pat. No. 3,030,215. Microspheres prepared from heat expanded natural minerals such as perlite, volcanic ash, fly ash, vermiculite, etc., also may be used.

Hollow glass microspheres (also referred to as glass bubbles or glass beads) which are useful in the present invention are available commercially from The 3M Company under the trade designation Scotchlite® Glass Bubbles. The chemical properties of these glass bubbles are reported to resemble those of a soda-lime-borosilicate glass. Glass bubble designation C15/250 has a nominal average particle density (ASTM D-2840) of 0.15 g/cc, a range of 0.12 to 0.18 g/cc and a calculated bulk density of 0.07 to 0.12 g/cc. Bubble type E22/400 has a nominal average particle density of 0.22 g/cc and a range of 0.19 to 0.25 g/cc. The bulk density of the E22/400 is in the range of 0.09 to 0.17. Other glass bubbles available from 3M include K-2 glass bubbles, S60/10,000 having a nominal average particle density of 0.60, and B23/500 having a nominal average particle density of 0.23. Inorganic hollow microspheres also are available from other commercial sources such as the Philadelphia Quartz Co., Valley Forge, Pa. under the designation "Q-CEL" Inorganic microspheres; Pittsburgh Corning Corp., Pittsburgh, Pa.; Emerson & Cuming Inc., Canton, Mass.; etc.

Organic resinous microspheres may also be utilized in the compositions of the present invention provided they are relatively inert and not soluble in the solvent (B). Thermoset resins generally have such properties. Examples include microspheres of epoxy resins; urea-formaldehyde having diameters ranging from 2-60 microns and a density of about 0.23; phenolic resin having a density of 0.2-0.35 g/cc and diameters ranging from about 2-50 microns (available from Union Carbide under the trade designation of phenolic "microballoons"); polyvinylidene polymers and copolymers having a density of 0.03 and an average diameter of 25-28 microns (e.g., those commercially available from Dow Chemical Company under the trade designation "Saran" dry expanded resin-bubbles); etc. For a description of these and other organic resin microspheres, see U.S. Pat. No. 2,797,201.

The adhesive compositions formulated in accordance with the present invention generally have a minimum viscosity of about 90 centipoises (cps), and the viscosity may be as high as 10,000 to 15,000 cps provided that the adhesive compositions can be readily applied to the surfaces to be bonded. The molecular weights of the polymers included in the adhesive composition of some embodiments described above affect the viscosity of the adhesive composition. The use of polymers having lower inherent viscosities permits a higher polymer percentage or loading and thereby lower the amount of solvent required to achieve a given viscosity. Viscosities may range from about 90 to about 15,000 cps and are readily obtained with the compositions of the present invention, and such viscosities are desirable since the adhesive may be applied to substrates without dripping and with little or no spillage.

The following examples illustrate the adhesive compositions of the invention. Examples A-W (Table I) illustrate adhesive compositions not containing a water-insoluble polymer, (i.e., adhesive compositions of the first embodiment) and Examples 1-33 (Tables II-IV) illustrate adhesive compositions containing PVC, a water-insoluble polymer (i.e., adhesive compositions of the second embodiment). Adhesive compositions similar to Examples 1-33 can be prepared utilizing ABS or CPVC in lieu of the PVC. The PVC used in Examples 1, 2 and 4-33 is PVC 2066 from Georgia Gulf having an IV of 0.68, and the PVC used in Example 3 is Georgia Gulf PVC 1055 having an IV of 0.52.

The viscosities of the adhesive compositions of the Examples are reported in Tables I-IV as initially prepared, and in some instances, after 24 hours and 1 week. The viscosities of the adhesive compositions of the invention are determined in accordance with ASTM Test D1084.

Unless otherwise indicated in the following examples and elsewhere in the written description and claims, all parts and percentages are by weight, temperatures are in degrees centigrade, and pressure is at or near atmospheric pressure.

TABLE I

| | Examples A-W (%/w) | | | | | | | |
|---|---|---|---|---|---|---|---|---|
| Adhesive Example | DMSO | MEK | ACE | CYH | MIBK | NMP | ACPH | ACAC |
| A | 2.5 | 97.5 | | | | | | |
| B | 5 | 95 | | | | | | |
| C | 25 | 75 | | | | | | |

TABLE I-continued

| | Examples A-W (%/w) | | | | | | | |
|---|---|---|---|---|---|---|---|---|
| Adhesive Example | DMSO | MEK | ACE | CYH | MIBK | NMP | ACPH | ACAC |
| D | 50 | 50 | | | | | | |
| E | 75 | 25 | | | | | | |
| F | 5 | — | 95 | | | | | |
| G | 25 | — | 75 | | | | | |
| H | 50 | | 50 | | | | | |
| I | 75 | | 25 | | | | | |
| J | 33.3 | 33.3 | | 33.3 | | | | |
| K | 33.3 | | 33.3 | 33.3 | | | | |
| L | 50 | — | — | 50 | | | | |
| M | 5 | | | | 95 | | | |
| N | 25 | | | | 75 | | | |
| O | 50 | | | | 50 | | | |
| P | 75 | | | | 25 | | | |
| Q | 25 | | | | | 75 | | |
| R | 50 | | | | | 50 | | |
| S | 75 | | | | | 25 | | |
| T | 75 | | | | | | 25 | |
| U | 25 | | | | | | | 75 |
| V | 50 | | | | | | | 50 |
| W | 75 | | | | | | | 25 |

TABLE II

| Adhesive | Examples 1-18 (%/w) | | | | | | Viscosity (cp min.) | | |
|---|---|---|---|---|---|---|---|---|---|
| Example | PVC | DMSO | MEK | CYH | ACE | OTHER | INIT | 24 hr. | 1 week |
| 1 | 10 | 45 | 45 | — | — | — | 40 | — | — |
| 2 | 12 | 44 | 44 | — | — | — | 150 | 180 | 220 |
| 3 | 12[a] | 44 | 44 | — | — | — | 180 | — | 330 |
| 4 | 12 | 44 | — | — | 44 | — | 580 | — | — |
| 5 | 13 | 29 | 29 | 29 | — | — | 150 | 170 | 160 |
| 6 | 13 | 35 | 22 | 28.5 | — | b | 1350 | 1500 | — |
| 7 | 12 | 29.3 | 29.3 | 29.3 | — | — | 90 | 90 | 90 |
| 8 | 12 | 15 | 43.7 | 29.3 | — | — | 60 | 60 | 60 |
| 9 | 12 | 10 | 48.7 | 29.3 | — | — | 60 | — | — |
| 10 | 12 | 5 | 53.7 | 29.3 | — | — | 60 | — | 70 |
| 11 | 13 | 15 | 42.7 | 29.3 | — | — | — | — | — |
| 12 | 10 | 30 | 30 | — | 30 | — | 70 | — | — |
| 13 | 13 | 29 | 29 | | 29 | — | 270 | — | — |
| 14 | 6 | 54 | 20 | — | 20 | — | — | — | — |
| 15 | 12 | 29.3 | 29.3 | | 29.3 | — | 150 | 180 | — |
| 16 | 11 | 29.66 | 29.66 | — | 29.66 | — | 110 | 130 | — |
| 17 | 13 | 28.5 | 28.5 | 28.5 | — | b | 1300 | | |
| 18 | 11.82 | 28.9 | 28.9 | 28.9 | — | c | 950 | — | 1070 |

[a]IV = 0.52
b 1.5% fumed silica
c 1.48% fumed silica

TABLE III

| | Examples 19-28 (%/w) | | | | | Viscosity (cp min.) | | |
|---|---|---|---|---|---|---|---|---|
| Adhesive Example | PVC | DMSO | ACE | MEK | NMP | OTHER | INIT | 24 hr. | 1 week |
| 19 | 12 | 29.3 | 29.3 | — | 29.3 | — | 120 | 120 | 180 |
| 20 | 10 | 29.1 | 29.1 | — | 29.2 | d | 250 | 270 | 360 |
| 21 | 12 | 28.8 | 28.8 | — | 28.8 | b | 200 | — | 610 |
| 22 | 12 | 39.5 | 38.5 | — | 10 | — | 300 | 390 | — |
| 23 | 10 | 29.5 | 29.5 | — | 29.5 | e | 190 | 210 | — |
| 24 | 11.5 | 23 | 23 | 19 | 22 | e | 210 | 220 | — |
| 25 | 11.5 | 23.4 | 23.4 | 19.4 | 22.3 | — | 50 | — | — |
| 26 | 12 | 28.8 | 28.8 | 28.8 | — | b | 830 | — | — |

TABLE III-continued

| | Examples 19-28 (%/w) | | | | | | | | |
|---|---|---|---|---|---|---|---|---|---|
| | | | | | | | Viscosity (cp min.) | | |
| Adhesive Example | PVC | DMSO | ACE | MEK | NMP | OTHER | INIT | 24 hr. | 1 week |
| 27 | 12 | 28.5 | 28.5 | 28.5 | — | f | — | — | — |
| 28 | 12 | 44.0 | — | — | — | g | 60 | — | — |

b) 1.5% fumed silica
d) 2.5% Paraloid K-120 N
e) 1.5% Paraloid K-120 N
f) 2.5% fumed silica
g) 44% THF

TABLE IV

| | Examples 29-33 (%/w) | | | | | | | | | |
|---|---|---|---|---|---|---|---|---|---|---|
| | | | | | | | | Viscosity (cp min.) | | |
| | PVC | DMSO | MEK | MIBK | ACE | CYP | ACPH | ACAC | INIT | 24 hr. | 1 week |
| 29 | 12 | 29.3 | 29.3 | — | 29.3 | 29.3 | — | — | 80 | 80 | |
| 30 | 12 | 29.3 | — | 29.3 | 29.3 | — | — | — | 130 | | |
| 31 | 12 | 29.3 | — | — | 29.3 | — | 29.3 | — | 310 | | |
| 32 | 12 | 29.3 | — | — | 29.3 | — | — | 29.3 | >2700 | | |
| 33 | 12 | 44 | — | 44 | — | — | — | — | — | — | — |

The adhesive compositions described above and illustrated in the above examples are useful in a variety of applications including use as adhesives, cements (including solvent cements), glues or pastes for holding together materials by surface attachment, and as sealants which are load-bearing elastic joining and insulating materials. The compositions are particularly useful as adhesives for bonding or welding two or more plastic surfaces together. The adhesive compositions of the first embodiment (i.e., not containing a water insoluble polymer) are useful for non-load bearing structural items or for pipes not controlled by ASTM regulations. The adhesive compositions of the second embodiment containing at least a certain minimum amount of the water insoluble ABS, PVC, or CPVC will meet the standards for solvent cements in the United States as specified in ASTM D2564-80. For example, for use on PVC, surfaces and pipes, the adhesive compositions must contain at least 10% by weight of PVC. The treated surface must have a minimum lap shear strength of 250 psi after a 2 hour cure, 500 psi minimum after a 16 hour cure, and at least 900 psi after a 72 hour cure.

In particular, the adhesive compositions of the invention are useful for bonding or welding a first plastic surface to a second plastic surface, and the method comprises (I) applying to the first surface or second surface or both surfaces, an adhesive composition of the present invention (II) contacting the first surface with the second surface; and (III) allowing the adhesive composition to form a bond or weld between the first surface and the second surface.

The compositions of the present invention are easy to apply to the plastic surfaces, are cost effective, and cure within a reasonable period of time without the use of heat, pressure, UV light or extraordinary mechanical devices. The bonding or adhesive properties are satisfactory for the intended uses whether non pressure drain, waste, vent (DWV), applications or pressure systems used in potable water applications. One particular advantage of the adhesive compositions of the present invention is that the compositions are a one-component system and are "plumber friendly".

The composition may be applied to the first surface or the second surface or both surfaces of the plastic material by techniques well known to those skilled in the art. For example, the adhesive may be applied using the standard Dauber which is included with the can of cement in accordance with current practice. The amount of the composition applied to the surface is a minimum amount which will effect the desired bonding or welding when the two plastic surfaces are brought into contact.

Prior to the application of the compositions of this invention to the plastic surfaces, the surface may be cleaned and/or primed to prepare the surface for accepting the adhesive compositions of the invention and improving the bond between the adhesive and the plastic surface. All plastic surfaces to be joined should be cleaned using a chemical cleaner which contains one or more volatile organic liquids, preferably liquids that are solvents for the plastic. The cleaner is designed to remove dirt, grease, oils, glass and any other materials left on the plastic surface from the manufacturing process such as waxes and lubricants.

Primers are solvent systems containing one or more solvents capable of penetrating and dissolving the plastic faster than the adhesive composition. The more aggressive primers show an ASTM designation of F-656 on the label whereas the less aggressive primers may show "Primer/Cleaner" on the label. Primers should be used wherever code bodies have determined that primers are necessary to ensure satisfactory leak-proof joints such as, for example, on schedule 80 pipe. Primers and cleaners may be applied with any type of applicator.

In one embodiment, the plastic surfaces which may joined with the compositions in an accordance with the method of the present invention include ABS, PVC and CPVC plastic surfaces including in particular plastic pipes and fittings. When pipes are to be joined using fittings, the adhesive composition may be applied to the inner surface of the plastic fitting or the outer surface of the plastic pipe, or the adhesive may be applied to both the inner surface of the fitting and the outer surface of the pipe, and the fitting is then applied over the end of the pipe. Upon drying under ambient conditions, a strong bond or weld is formed between the pipe and the fitting.

As a general rule, the water-insoluble resin present in some of the adhesive compositions will be of the same type as the plastic surface to be bonded or welded. That is, when ABS pipe and fittings are to be joined, the adhesive composition utilized preferably contains ABS resin rather than PVC or CPVC resin. When the plastic surface such as a pipe or fitting comprises PVC, the resin contained in the adhesive composition is PVC or mixtures of PVC and CPVC. Similarly, when the plastic surfaces to be joined comprise CPVC resin, the adhesive composition generally contains CPVC or mixtures of CPVC and PVC.

The utility of the method and the compositions described herein as solvent cements for PVC pipes and fittings is demonstrated by testing the compositions of the Examples for joining PVC to PVC parts per ASTM D-2564. The lap shear strengths after 2 hours, 16 hours, 72 hours and one week of cure were determined for Examples, and in some instances the lap shear strength was determined after 2 weeks and 3 weeks. The results are summarized in the following tables V and VI.

TABLE V

| | LAP Shear Test Results (psi) | | | | | |
|---|---|---|---|---|---|---|
| Adhesive Example | 2 hrs. | 16 hrs. | 72 hrs. | 1 week | 2 weeks | 3 weeks |
| A | 355 | 709 | 955 | 944 | 1309 | — |
| B | 454 | 708 | 1319 | 1210 | 1278 | 1481 |
| C | 369 | 700 | 1346 | 1017 | 1409 | 1500 |
| D | 403 | 880 | 1336 | 1873 | 1500 | — |
| E | 246 | 536 | 308 | 547 | 878 | 528 |
| F | 435 | 698 | 655 | 554 | 447 | 644 |
| G | 472 | 728 | 952 | 1403 | 1273 | 1235 |
| H | 390 | 800 | 1273 | 1414 | — | — |
| I | 230 | 565 | 307 | 236 | 334 | 430 |
| J | 311 | 679 | 1194 | 1471 | — | — |
| K | 367 | 677 | 1157 | 1538 | — | — |
| L | 227 | 445 | 938 | 1370 | — | — |
| M | 58 | 266 | 183 | 197 | 257 | 232 |
| N | 263 | 495 | 475 | 820 | 982 | 1082 |
| O | 492 | 929 | 1105 | 1202 | 1421 | 1225 |
| P | 94 | 468 | 808 | 691 | 864 | 790 |
| Q | 282 | 503 | 1117 | 1346 | 1415 | 1411 |
| R | 412 | 982 | 870 | 1388 | 1383 | 1460 |
| S | 182 | 656 | 306 | 658 | 728 | 687 |
| T | — | 164 | 239 | 227 | 146 | 126 |
| U | 257 | 428 | 617 | 702 | 908 | 714 |
| V | 240 | 466 | 581 | 705 | 917 | 809 |
| W | 106 | 150 | 78 | 106 | 200 | 62 |

TABLE VI

| | Lap Shear Test Results (psi) | | | |
|---|---|---|---|---|
| Adhesive Example | 2 hrs. | 16 hrs. | 72 hrs. | 1 week |
| 1 | 320 | 636 | 1002 | — |
| 2 | 412 | 810 | 1347 | 1165 |
| 3 | 372 | 741 | 1294 | 1439 |
| 4 | — | — | 722 | — |
| 5 | 289 | 476 | 868 | — |
| 6 | — | 503 | 875 | — |
| 7 | 297 | 627 | 982 | 1471 |
| 8 | 256 | 574 | 921 | — |
| 9 | 281 | 515 | 869 | — |

TABLE VI-continued

| | Lap Shear Test Results (psi) | | | |
|---|---|---|---|---|
| Adhesive Example | 2 hrs. | 16 hrs. | 72 hrs. | 1 week |
| 10 | 309 | 602 | 930 | — |
| 11 | 318 | 574 | 962 | — |
| 12 | 378 | 774 | 1204 | — |
| 13 | 313 | 740 | 1024 | — |
| 14 | — | 719 | 880 | — |
| 15 | 356 | 778 | 1193 | 1305 |
| 16 | 393 | 820 | 1242 | >1400 |
| 17 | 284 | 577 | 735 | — |
| 18 | 306 | 556 | 970 | — |
| 19 | 329 | 745 | 1117 | 977 |
| 20 | 267 | 637 | 1079 | — |
| 21 | 339 | 610 | 1040 | — |
| 22 | 342 | 689 | 1177 | — |
| 23 | 275 | 706 | 1329 | 1471 |
| 24 | 292 | 709 | 1038 | 1295 |
| 25 | 455 | 890 | 1172 | — |
| 26 | 396 | 1117 | 1272 | — |
| 27 | 357 | 690 | 1197 | — |
| 28 | — | 749 | — | — |
| 29 | 284 | 580 | 1019 | — |
| 30 | 307 | 648 | 868 | 976 |
| 31 | 285 | 518 | 800 | — |
| 32 | 354 | 549 | 885 | — |
| 33 | 275 | 804 | — | — |

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. An adhesive composition which is free of acrylonitrile-butadiene-styrene polymers, alkyl substituted benzenes and alkyl substituted naphthalenes and which comprises a mixture of:

(a) at least one organic sulfoxide, sulfone, or sulfide, or a mixture of two or more thereof, wherein the sulfoxide, sulfone and sulfide are characterized by the formulae $R_2SO$ (I) $R_2SO_2$ (II) and $R_2S$ (III) respectively wherein each R is independently an alkyl or an aryl group, and (b) at least one ketone, ether, ester, amide, carbonate, or a mixture of two or more thereof and (c) from about 1% to about 60% by weight at least one water insoluble polyvinyl chloride, chlorinated polyvinyl chloride, or a mixture of two or more thereof.

2. The adhesive composition of claim 1 also comprising (d) at least one water-insoluble polymer comprising acrylic polymers, vinyl aromatic polymers and vinyl pyrrolidone polymers.

3. The adhesive composition of claim 1 also comprising from about 10 to about 15% by weight of polyvinyl chloride.

4. The adhesive composition of claim 1 wherein the ketone comprises acetone, methyl ethyl ketone, methyl isobutyl ketone, isophorone, cyclopentanone, cyclohexanone, acetyl acetone or acetophenone, or a mixture of two or more thereof.

5. An adhesive composition which is free of acrylonitrile-butadiene-styrene polymers, alkyl substituted benzenes and alkyl substituted naphthalenes and comprises:

(a) from about 1% to about 30% by weight of a water-insoluble polyvinyl chloride, a chlorinated polyvinyl chloride, or a mixture of two or more thereof, and (b) a solvent mixture comprising (b-1) at least one organic sulfoxide, sulfone, or sulfide or a mixture of two or more thereof, wherein the sulfoxide, sulfone and sulfide are characterized by the formulae $R_2SO$ (I), $R_2SO_2$ (II), and $R_2S$ (III) respectively wherein each R is independently an alkyl or an aryl group, and (b-2) at least one ketone, ether, ester, amide or carbonate, or a mixture of two or more thereof.

6. The adhesive composition of claim 5 comprising from about 10 to about 15% by weight of polyvinyl chloride, chlorinated polyvinyl chloride, or mixtures of two or more thereof.

7. The adhesive composition of claim 5 wherein (b-1) is a dialkyl sulfoxide containing from 1 to about 5 carbon atoms.

8. The adhesive composition of claim 5 wherein (b-1) is dimethyl sulfoxide.

9. The adhesive composition of claim 5 wherein (b-2) comprises at least two ketones.

10. The adhesive composition of claim 5 wherein (b-2) comprises at least one ketone and N-methyl pyrrolidone.

11. The adhesive composition of claim 5 wherein the ketones comprise acetone, methyl ethyl ketone, methyl propyl ketone, methyl isobutyl ketone, isophorone, cyclopentanone, cyclohexanone, acetyl acetone, acetophenone, or a mixture of two or more thereof.

12. The adhesive composition of claim 5 also comprising at least one second water insoluble polymer comprising acrylic polymers, vinyl aromatic polymers, vinyl pyrrolidone polymers, or a mixture thereof.

13. The adhesive composition of claim 5 also comprising at least one water-insoluble acrylic polymer.

14. An adhesive composition which is free of acrylonitrile-butadiene-styrene polymers, alkyl substituted benzene and alkyl substituted naphthalene and comprises:

(a) from about 10% to about 15% by weight of polyvinyl chloride, chlorinated polyvinyl chloride, or mixtures of two or more thereof, and (b) a solvent comprising a mixture of dimethyl sulfoxide and at least one ketone.

15. The adhesive composition of claim 14 wherein (a) is polyvinyl chloride.

16. The adhesive composition of claim 14 wherein the solvent comprises dimethyl sulfoxide and at least two ketones.

17. The adhesive composition of claim 14 wherein the solvent (b) comprises dimethyl sulfoxide, at least one ketone and N-methyl pyrrolidone.

18. The adhesive composition of claim 14 which is free of tetrahydrofuran.

19. A method of adhesively bonding or welding a first plastic surface to a second plastic surface which comprises:

(I) applying to the first surface or the second surface, or to both surfaces, the adhesive composition of claim 1;

(II) contacting the first surface with the second surface; and (III) allowing the adhesive composition to form a bond or weld between the first surface and the second surface.

20. A method of adhesively bonding or welding a first plastic surface to a second plastic surface which comprises:

(I) applying to the first surface or the second surface, or to both surfaces, the adhesive composition of claim 5;

(II) contacting the first surface with the second surface; and (III) allowing the adhesive composition to form a bond or weld between the first surface and the second surface.

* * * * *